Feb. 13, 1962 H. FRENK 3,020,816
SHUTTER FOR PHOTOGRAPHIC APPARATUS
Filed Feb. 26, 1960 3 Sheets-Sheet 3

INVENTOR
HELMUTH FRENK
BY Toulmin & Toulmin

ATTORNEYS

United States Patent Office 3,020,816
Patented Feb. 13, 1962

3,020,816
SHUTTER FOR PHOTOGRAPHIC APPARATUS
Helmüth Frenk, Wetzlar (Lahn), Germany, assignor to Ernst Leitz Gesellschaft mit beschrankter Haftung, Wetzlar (Lahn), Germany
Filed Feb. 26, 1960, Ser. No. 11,266
Claims priority, application Germany Feb. 28, 1959
9 Claims. (Cl. 95—58)

The present invention relates to photographic apparatus. More in particular, the present invention relates to a shutter for use in photographic apparatus, and more particularly still to a shutter of the type whose blades are moved by the energy produced in a magnetic field.

It is known in the art to provide a shutter, for example of the conventional central shutter type, the laminations of blades of which can be opened and closed by the force of an electromagnetic field. The blades are moved entirely mechanically and only the usual mechanical energy source has been replaced by an electromagnet, adapted to revolve an armature the movement of which is transmitted to the shutter blades by mechanical transmission means, such as gears and the like.

It has also become known to provide a shutter diaphragm having a fixed opening and adapted to move between the respective poles of two or several magnets. The shutter diaphragm has coils conducting a reversible direct current. The direction of movement of the shutter is determined by the direction of current flow through the coils, and it is moved towards the poles of one of the magnets, and then towards the poles of another magnet, thereby releasing for a predetermined time the opening of the shutter.

It is the object of the present invention to provide a shutter for photographic apparatus which is opened and closed directly by the influence of the forces produced in a magnetic field and without any transmission means.

This object as well as further objects and advantages of the present invention, which will become apparent as the description thereof proceeds, are accomplished by the shutter of the invention wherein the shutter laminations or blades composed, at least partly, of a hard or soft magnetizable material and which are moved into the opening and closing positions and maintained therein as long as required by the attracting or repelling forces created between the poles of equal or opposite polarity of at least two magnet systems. The magnetic fields produced by these two systems are inclinedly disposed relative to one another. The opening and closing of the shutter is effected by aligning the blades magnetically following the polarity of the effective magnetic system.

The invention will be better understood upon the following detailed description of the accompanying drawings, wherein FIGURE 1 is a somewhat schematic, partly perspective and partly diagrammatic view of one embodiment of the invention, showing the shutter in its closed position;

FIGURE 4 is a perspective view showing another embodiment of the shutter blades according to the invention;

FIGURES 4b and 4c are schematic views illustrating the cooperation of the shutter blades and the various pole means in the embodiment according to FIGURE 4a;

Figure 1:
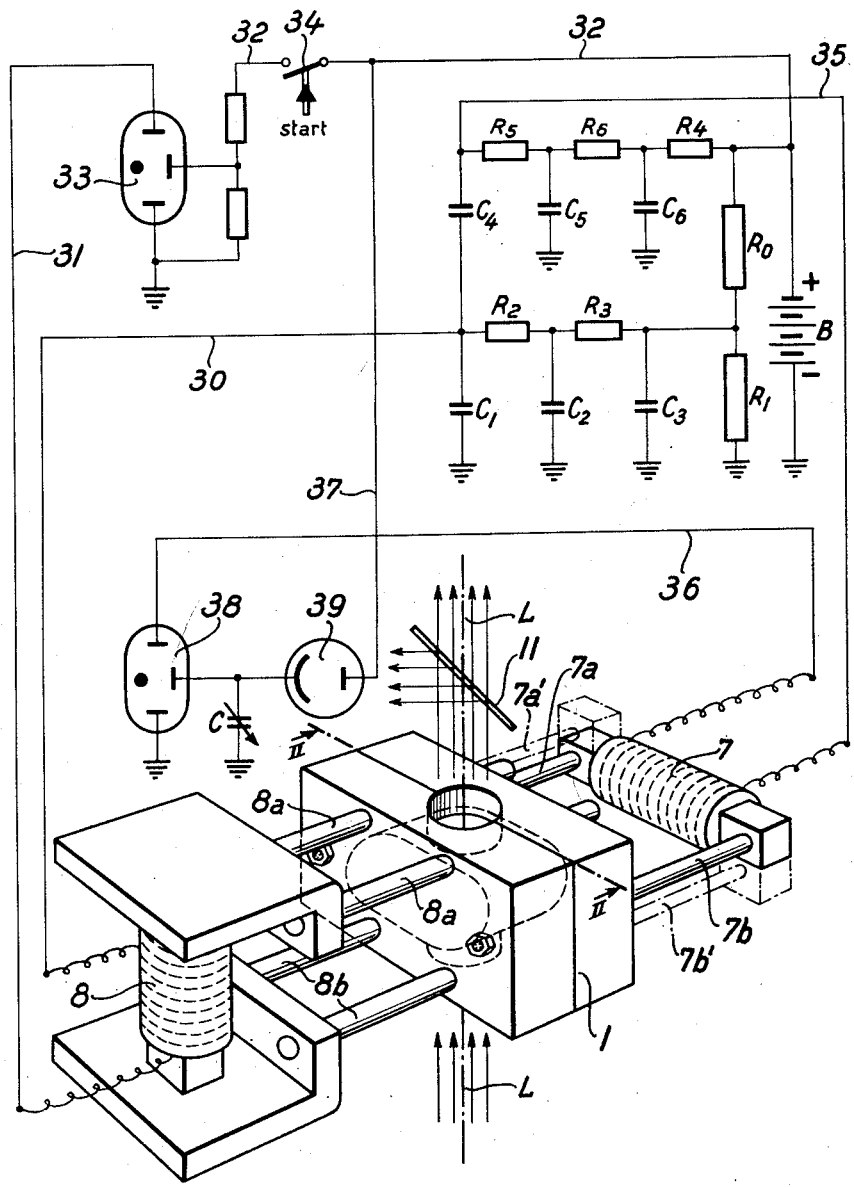
Figure 2:
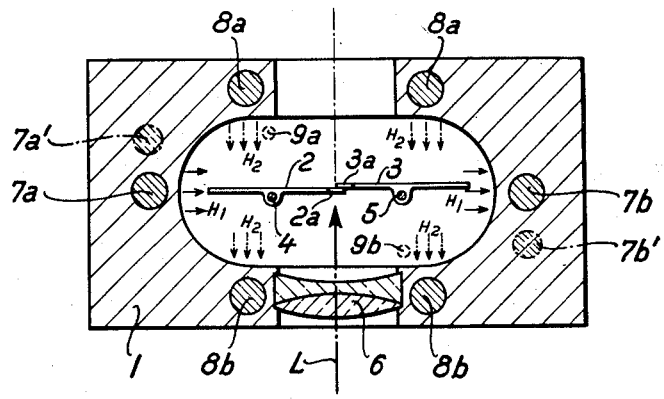
FIGURE 2 is a sectional view, taken along lines II—II in FIGURE 1, and shows the blades and the various poles actuating the blades.
Figure 3:
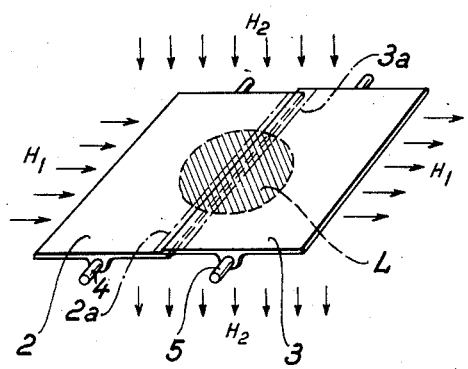
FIGURE 3 is a plan view illustrating two shutter blades as used in the embodiment of FIGURES 1 and 2.

Referring now to the drawings more in detail and turning first to FIGURES 1 to 3, the shutter according to the present invention comprises a shutter body 1 disposed, very much like a conventional diaphragm shutter, in the path of rays α of a microphotographic apparatus. Two shutter blades 2, 3 of magnetizable material are rotatably mounted on shafts 4 and 5. The shutter body 1 can also be used as a support for one or several optical members 6 of the optical image-forming system.

The shutter is further provided with means for directly moving the blades 2, 3, by means of the energy produced in an electromagnetic field, which means comprise two electromagnetic systems 7 and 8, having main pole shoes 7a, 7b and 8a, 8b, respectively. The main pole shoes are positioned as close as possible to the pivoting range of the main pole shoes. Systems 7 and 8 may also have auxiliary pole shoes 7a', 7b' which assist in obtaining a desired direction of the pivoting movement of blades 2, 3. In the embodiment shown in FIGURES 1 to 3 magnet 7 is used, for example, as the closing magnet, whereas 8 is the opening magnet. For reasons stated below the overlapping portions 2a, 3a of blades 2, 3 may consist of non-magnetizable material, and auxiliary detents 9a, 9b, also consisting of non-magnetizable material, can be disposed in the pivoting range of the blades.

The afore-described structure cooperates as follows: If the opening magnet 8 is switched in, a magnetic field $H_2$ is built up between pole shoes 8a and 8b. The shutter blades then become aligned with the direction of this magnetic field, thereby opening the shutter to receive the path of rays α. If, on the other hand, the closing magnet 7 is switched in, a magnetic field $H_1$ is built up between pole shoes 7a, 7b, and the shutter blades become aligned with the direction of this magnetic field, thereby closing the shutter with respect to the path of rays α. The shutter can thus be opened and closed by alternatingly switching in and off magnet systems 7 and 8, so as to cause readjustment of the blades 2, 3 with the respective field lines of magnetic field $H_1$ and $H_2$, respectively. The non-magnetizable overlapping portions 2a, 3a prevent the blades from sticking together in the closing position shown in FIGURES 2 and 3. The pivoting movement into opening position is limited by detents 9a and 9b.

From the foregoing it will be apparent that blade 2, 3, having a comparatively small mass, are the only moving elements in the shutter according to the invention. Very short exposure times can be obtained by building up as well as destroying the magnetic fields $H_1$, $H_2$ very rapidly. This calls for the particular means of a further embodiment of the invention to be presently described, for the following reasons: The air gaps between the pole shoes of magnet systems 7, 8 are comparatively wide ones. It, therefore, becomes necessary to provide rather strong magnetic fields $H_1$, $H_2$, for effecting a rapid displacement of the shutter blades from the closing position to the opening position and vice versa. On the other hand, comparatively weak magnetic fields are entirely sufficient to maintain the blades in the closing position or in the opening position, once such position has been accomplished by a strong magnetic field. Now, with a given magnet coil, it is the current intensity which determines the rapid establishment of a comparatively strong magnetic field. It will thus be apparent that a high current intensity is required for a short period of time in order to build up the required strong magnetic field, and that thereafter a much lower current intensity is entirely sufficient for keeping the blades in their respective open or closed positions.

According to another embodiment of the invention, the shutter is, therefore, equipped with an electric dosage device which controls electromagnets 7, 8 and effects the supply of a strong current impulse for building up a strong magnetic field whenever magnets 7 or 8 are switched in, whereupon the current intensity swiftly drops to a lower value, sufficent for maintaining blades 2, 3 in their respective positions. This change in current intensity also prevents the blades from being pivoted beyond their desired end positions and from oscillating about the end positions.

The electric dosage device according to the invention as shown in FIGURE 1 comprises a D.C. source B, a thyratron 33 making and breaking circuit with electromagnet 8, and a thyratron 38 making and breaking circuit with electromagnet 7, a starting switch 34, a photoelectric cell 39, and a capacitor C. Current source B is connected with thyratron 33 via line 30, the coil of electromagnet 8, and line 31. It is further connected with thyratron 38 via line 35, the coil of electromagnet 7 and line 36. The control grid of thyratron 33 is connected with current source B via a voltage divider and the starting switch 34 via line 32. The control grid of thyratron 38 is connected with current source B via the photoelectric cell 39 and lines 37 and 32.

The opening of the shutter is initiated by operating starting switch 34. The photoelectric cell 39 receives light rays from a semi-transparent mirror 11, disposed in the path of rays α behind the shutter. The cell ignites thyratron 39 in cooperation with a capacitor C and depending upon the light intensity from the object as transmitted by mirror 11. The exposure time can be adjusted to different degrees of sensitivity of the film material used, by adjusting the capacity of capacitor C.

In order to feed the opening and closing magnets 7 and 8, respectively, with current of the requisite intensities, provision is made for a plurality of resistance and capacitor units, preferably arranged as a resistance-capacitor (RC-) chain.

The RC-chain associated with opening magnet 8 consists, for example, of three capacitors $C_1$, $C_2$, $C_3$, and two resistances $R_2$ and $R_3$. The capacitors are charged by voltage divider $R_0$, $R_1$. The time constants $R_2 \cdot C_2$ and $R_3 \cdot C_3$ have the same value as or are greater than the time constant determined by the product of $C_1$ and the resistance of the coil of magnet 8.

The RC-chain associated with closing magnet 7 may consist, for example, of the three capacitors $C_4$, $C_5$, $C_6$, and the two resistances $R_5$ and $R_6$, charged via $R_4$. Again, the time constants $R_5 \cdot C_5$ and $R_6 \cdot C_6$ are the same as, or are greater than the time constant of $C_4$ times the resistance of the coil of closing magnet 7. It is to be noted that capacitor $C_4$ is connected in series with capacitor $C_1$, and that voltage divider $R_0$, $R_1$ and the respective capacities of capacitors $C_1$ to $C_6$ are so chosen that the charge, i.e. capacity times voltage, of capacitor $C_4$ is greater than the charge of capacitor $C_1$, and that the total charge of capacitors $C_4+C_5+C_6$ is greater than the total charge of $C_1+C_2+C_3$.

The operation is as follows: Opening magnet 8 is switched in by closing the starting switch 34, which ignites thyratron 33. As a consequence, the RC-chain $C_1$, $R_2$, $C_2$, $R_3$, $C_3$, starts to discharge. The capacitors $C_2$ and $C_3$ continue to supply current sufficient to maintain the blades in their respective end positions and prevent their being pivoted beyond the same. At the same time, a voltage is maintained at capacitor $C_1$, corresponding approximately to the operating voltage of thyratron 33.

As soon as thyratron 38 is ignited by the photoelectric cell 39, closing magnet 7 is excited, although without immediately closing the shutter. This delay is due to the fact that the opening magnet 8 still has some current, which can be comparatively great in case of short exposure times. The delay is, however, compensated by the series connection of $C_4$ and $C_1$, accelerating the discharge of $C_1$ and de-activating thyratron 33, a negative charging being prevented by diode 40. By this arrangement very short exposure times are effected. If $C_4$ were connected with mass rather than with $C_1$, the closing of the shutter would be delay by the discharge currents of $C_1$, $C_2$, $C_3$.

The auxiliary means for de-activating thyratron 38 after each exposure and for re-charging the capacitors $C_1$ through $C_6$, and for maintaining starting contact 34 during each exposure, are all conventional and well known in the art and have, therefore, been omitted in the drawings.

It will be noted that any suitable current source can be used as source B, such as, for example, a battery, an A.C.—D.C. transformer, and the like. Instead of thyratrons 33. 38 electron tubes or transistors susceptible for use as switch means can be employed, but it is equally possible to use electromechanical circuit breakers or switch relays. Furthermore, the number of resistances and capacitors forming the RC-chains can be varied, so that, e.g., only two RC-members are provided, in which case RC-members of greater capacity must be used. It is also possible to provide only the two capacitors $C_1$ and $C_4$, provided their capacity is greater than the total capacity of capacitors $C_1+C_2+C_3$ or $C_4+C_5+C_6$, respectively.

In the afore-described embodiment the laminations or blades were arranged in a Venetian shutter-type manner. It is, however, also possible to provide blades consisting of cylinder segments moving along a circular path. This is shown, for example, in the embodiments of FIGURES 4 and 5.

Figure 4A:
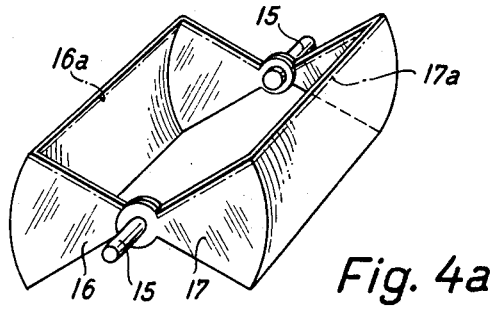
Figure 4B:
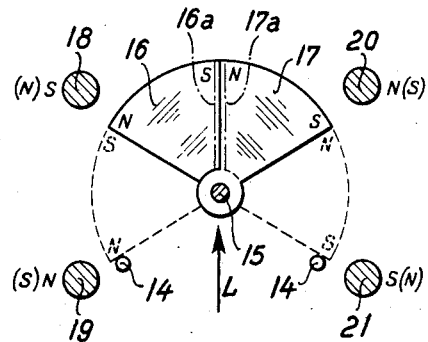
Figure 4C:
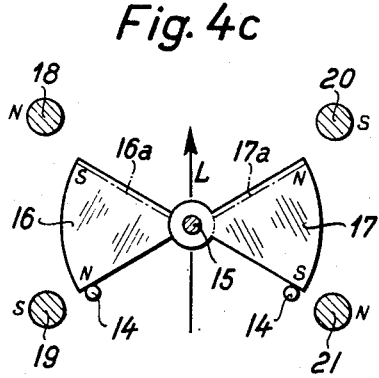

In the embodiment of FIGURES 4a, 4b, 4c, the shutter blades 16, 17 formed as cylinder segments are rotatably mounted on common shafts 15 and consist of magnetically hard material, thus forming permanent magnets. The edges 16a, 17a overlapping in the closing position may consist of non-magnetizable material so as to prevent the blades from sticking together when opening the shutter. The blades are so magnetized that, in the closing position, opposite poles are facing each other. Electromagnet systems comparable with the systems 7, 8, shown in the embodiment of FIGURES 1 to 3, and therefore not illustrated in detail, comprise pole shoes 18, 19, 20, 21, which latter are positioned at the periphery of the circular path of blades 16 and 17, and which are of reversible polarity. The pole shoes are so positioned with respect to the end positions of shutter blades 16, 17, that in the respective end positions of the blades the magnetic poles of the latter face the pole shoes 18, 19, 20, 21, and a determined magnetic force component is formed upon changing the polarity of the pole shoes so as to have the same polarity as those of the poles of the shutter blades which they are facing. This determined magnetic force component then moves the blades in the desired opening or closing position.

It will again be found of advantage to provide stop members 14 of non-magnetizable material in the opening path of movement of the shutter blades.

Figure 5A:
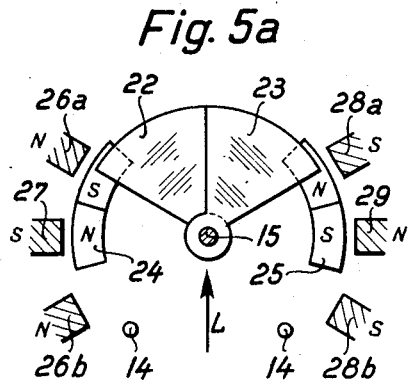
FIGURES 5a and 5b are schematic views illustrating another embodiment of the invention.
Figure 5B:
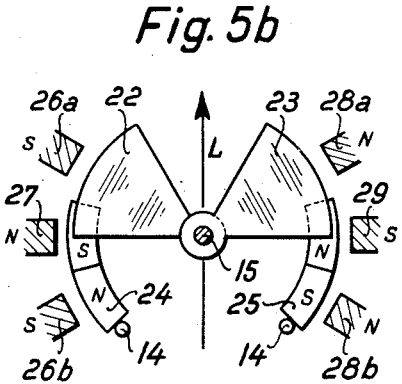

According to the embodiment shown in FIGURES 5a and 5b the cylinder segment-shaped shutter blades are designated as 22 and 23. They are again rotatably mounted on common shafts 15 and consist of a non-magnetizable material such as, for instance, aluminum. The shutter blades have permanent magnets 24, 25 cooperating with the pole shoes 26a, 26b, 27, and 28a, 28b, 29 of two electromagnetic systems the details of which have been omitted in the drawing. The pole shoes are disposed at the periphery of the circular path of shutter blades 22, 23, and their polarity can be reversed by changing the current direction. It will be noted that the outer pole shoes 26a, 26b, and 28a, 28b, respectively, have the same polarities, whereas the central pole shoes 27, 29 have opposite polarities with respect to one another, to the poles of the blades, and to the outer pole shoes 26a, 26b, and 28a, 28b, respectively. By alternatingly reversing the polarities of the outer pole shoes 26a, 26b, and 28a, 28b, respectively, and of the central pole shoes 27, 29, the shutter blades 22, 23 are moved into their respective opening or closing positions. Again, it is possible to limit the opening displacement of shutter blades 22, 23 by stop members 14 composed of a non-magnetizable material.

It will be apparent from the foregoing that in the embodiment of FIGURES 4a to 4c and 5a and 5b the necessary displacing energy for the shutter blades is derived from the attracting or repelling forces of poles of equal or opposite polarity. The blades are maintained in their end positions by the attraction of poles of opposite polarity. The shutter is opened and closed by reversing the direction of current flow in the electromagnet systems; this can be effected by conventional and generally known mechanical or electronic switch means which need not be shown nor described in detail.

The embodiments of FIGURES 4a to 4c and 5a, 5b have the advantage of causing a rather negligible axial shift of the blade edges defining the shutter aperture. During the exposure the shutter is therefore situated closer to an optically advantageous plane, the aperture plane in the path of rays of the optical apparatus. They thus operate rather free of any vignetting effect. It is also possible to provide larger apertures.

The embodiments of FIGURES 1 to 3 have the advantage of the smallest feasible mass-inertia of the blades.

It will be noted that in the embodiments of FIGURES 1 to 3 the blades may also consist of a magnetically hard material which has been pre-magnetized. It is also possible to provide electromagnet systems with reversible polarities.

It will be understood that this invention is susceptible to modification in order to adapt it to different usages and conditions and, accordingly, it is desired to comprehend such modifications within this invention as may fall within the scope of the appended claims.

What is claimed is:

1. A shutter for photographic apparatus comprising a plurality of shutter blades consisting at least partly of magnetizable material, at least two magnet systems the respective fields of which are disposed perpendicularly relative to one another, means for reversing the polarity of the two magnet systems, said blades being positioned within the effective range of the fields of said magnet systems and being aligned with the fields of said magnet systems in one predetermined direction for opening said shutter, and being aligned with the fields in another predetermined direction upon reversal of said two fields according to the prevailing polarity thereof, thereby opening and closing, respectively, the shutter.

2. A shutter for photographic apparatus according to claim 1, said blades being composed of magnetically soft material.

3. A shutter for photographic apparatus according to claim 1, said blades being composed of magnetically hard material and being premagnetized.

4. A shutter for photographic apparatus according to claim 1, said magnet systems comprising a plurality of pole shoes magnetically cooperating with said blades.

5. A shutter for photographic apparatus according to claim 4, said magnet systems further including auxiliary pole shoes associated with said plurality of pole shoes.

6. A shutter for photographic apparatus according to claim 1, said blades being shaped as cylinder segments and including a plurality of magnets of fixed polarity connected therewith, said magnet systems being disposed at the periphery of the circular path of said cylinder segments, said magnet systems being of reversible polarity so as to attract and repel, respectively, said magnets connected with said cylinder segments.

7. A shutter for photographic apparatus comprising: a plurality of shutter blades each consisting at least partially magnetizable material, at least two magnet systems the respective fields of which being disposed perpendicularly relative to each other, means for reversing the polarity of said two magnet systems, said blades being positioned within the effective range of the fields of said magnet systems and being aligned therewith in one predetermined direction or another predetermined direction according to the prevailing polarity thereof, thereby opening and closing, respectively, said shutter, said blades having edges overlapping in the closing position of the shutter, said edges being composed of a non-magnetizable material.

8. Shutter for photographic apparatus comprising: a plurality of shutter blades consisting at least partly of magnetizable material; at least two electro-magnet systems of reversible polarity, the respective fields of which being disposed perpendicularly to each other, said blades being positioned within the effective range of the fields of said magnet systems and being aligned therewith in one predetermined direction for opening said shutter, and being aligned with said fields in another predetermined direction according to the prevailing polarity thereof for closing said shutter; thyratron means for controlling said electromagnet systems; and thyratron-triggering means, including a photocell, a semitransparent mirror, both being disposed in the object-path of rays behind said shutter, and an adjustable capacitor associated with said photoelectric cell, whereby the current for said photocell serves for charging said capacitor.

9. A shutter for photographic apparatus according to claim 1, including switching apparatus for controlling said magnet systems, said magnet systems being of the electromagnetic type, said switching means including a D.C. voltage source, voltage-divider resistances connected to said D.C. voltage source, chargeable capacitors connected to said voltage divided resistances, said capacitors having a common junction, said resistances and capacitors together with the electro-magnet systems forming a delay line having a large time constant, whereby said voltage divider and said capacitors are so dimensioned that the charge of one of said capacitors exceeds the charge of another one of said capacitors.

References Cited in the file of this patent

UNITED STATES PATENTS

| | | |
|---|---|---|
| 1,727,006 | Ellison | Sept. 3, 1929 |
| 2,702,500 | De Bell | Feb. 22, 1955 |
| 2,856,831 | Gipe | Oct. 21, 1958 |